Dec. 5, 1961  HENRI-GEORGES DOLL  3,012,190
MULTIPLE FREQUENCY ALTERNATING CURRENT NETWORK
Filed March 6, 1946
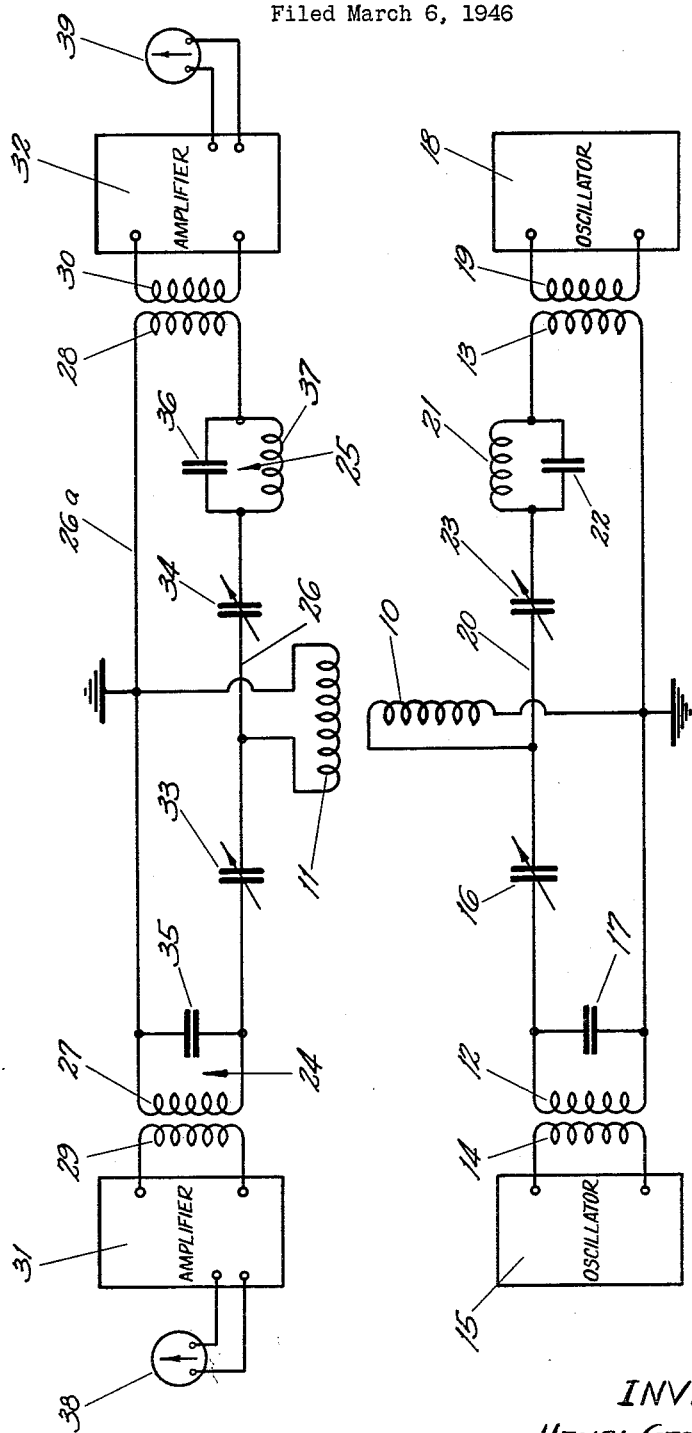
INVENTOR
HENRI-GEORGES DOLL United States Patent Office 3,012,190
Patented Dec. 5, 1961

3,012,190
MULTIPLE FREQUENCY ALTERNATING
CURRENT NETWORK
Henri-Georges Doll, Houston, Tex., assignor to Electro-Mechanical Research, Inc., Houston, Tex., a corporation of Texas
Filed Mar. 6, 1946, Ser. No. 652,331
9 Claims. (Cl. 324—41)

This invention relates to improvements in alternating current networks. It relates particularly to alternating current bridge networks that are useful for detecting and discriminating between metallic or nonmetallic objects in media having different physical and electrical properties.

Alternating current bridge networks have been used heretofore for the detection of metallic objects in the earth, wood or in other similarly nonmetallic media. Usually such bridges include an oscillator for supplying a current or signal of a desired frequency to a transmitting coil that is adapted to be positioned adjacent a medium being investigated. For mine detection, the coil is usually swept or moved in an arc at a height slightly above the surface of the earth. The device also includes a receiver or pickup coil disposed adjacent to the transmitter coil, an amplifier and an indicating or signalling device such as a headphone or voltmeter for indicating the presence of a mine.

Attempts have been made in the past to use such bridge networks for detecting nonmetallic objects such as nonmetallic or plastic mines. However, such devices have not been very successful inasmuch as, at the frequencies used, the signal produced by a nonmetallic mine is not readily distinguishable. Moreover, it has not been possible to determine whether the signal is due to a metallic or a nonmetallic object or mine.

An object of the invention is to provide an alternating current network wherein signals of different frequencies can be produced simultaneously to render the device capable of distinguishing between objects having different electrical properties.

Another object of the present invention is to provide an alternating current bridge network by means of which both metallic and nonmetallic mines can be detected in conductive earth or in water.

Another object of the invention is to provide an alternating current bridge network wherein different frequencies can be used simultaneously to render the device capable of detecting both metallic and nonmetallic objects.

An additional object of the invention is to provide an alternating current bridge network wherein signals of different frequencies can be produced simultaneously to render the device capable of distinguishing between, and indicating selectively the presence of, metallic and nonmetallic objects.

Other objects of the invention will become apparent from the following description of a typical form of network embodying the present invention.

In a typical embodiment of the present invention, a plurality of currents of different frequency are supplied to the input circuit of an alternating current network, for example, to the transmitting coil or system of coils of a mutual impedance bridge network. Signals are received by the output circuit of the network, which in a mine detector may include a pickup or receiving coil or system of coils, preferably arranged in such relation to the transmitter coil or system of coils as to have substantially no mutual inductance therewith. Hereinafter such coil systems will be referred to as coils.

When the transmitting coil is energized with two alternating currents of the same magnitude, but different frequencies, fields or eddy currents having the two frequencies are set up in the medium undergoing inspection. If the frequencies are as high as 50 kilocycles, the magnitudes of the signals which are induced in the receiving circuit due to the presence of a metallic object in the field will be substantially in the ratio of these frequencies.

When the coils are adjacent a conductive medium, like the ground, containing a nonmetallic object of appreciable dimensions, a different condition exists. The signal produced by the nonmetallic object increases as the square of the frequency. Therefore, when a nonmetallic object, such as a mine, is encountered, the higher frequency signal in the receiving coil as a result of the nonmetallic mine will be much stronger than the lower frequency signal and more so than in the case of metallic objects.

In order to make use of these two signals, for indicating the presence and the characteristics of the object, the two signals induced in the receiving coil are separated by suitable filtering means, are amplified separately, and are used to actuate suitable indicating means such as voltmeters or headphones. By comparing the amplitudes of the signals at the two frequencies, it is possible to determine whether the object is metallic or nonmetallic.

Thus, for example, the two signals may be supplied, in opposition, to a single indicating device and matched in such a ratio by providing amplifiers having different and well determined gains that, in the presence of a metallic object, the indicator will deflect in one direction, and in the presence of a nonmetallic object, the indicator will deflect in the opposite direction, thereby providing an indication of the presence of a foreign object and classifying it. Similar results may be obtained by supplying the amplified signals at the different frequencies to separate indicators and classifying the foreign object by comparing the respective deflections of the two indicators.

For a better understanding of the present invention, reference may be had to the accompanying drawing in which the single figure illustrates diagrammatically a typical alternating current bridge network embodying the present invention.

While the present invention may be used in a wide variety of alternating current networks in which two or more currents of different frequencies are to be utilized, the invention will be described in connection with an alternating current, mutual impedance bridge suitable for the detection and classification of metallic and nonmetallic mines in ground or water or for the detection and classification of other foreign objects in conductive media.

The form of alternating current bridge illustrated includes a first coil 10, referred to hereinafter as the transmitter coil, and a second coil 11, referred to hereinafter as the receiver coil, these coils being adjacent to each other and adapted to be mounted on a common support or frame, not shown, so that the coils 10 and 11 can be positioned in a desired place or may be moved together relatively to the surface of the earth when being used for mine detection. Preferably, one coil is placed perpendicular to the other coil and in a plane of symmetry with respect to said other coil so as to render their mutual impedance nil or substantially so, and both coils are arranged in symmetrical position with respect to the surface of the ground to eliminate the ground effect in the absence of mines and, therefore, facilitate the detection of nonmetallic mines. If desired, one or both of the coils can be divided into a plurality of coils as disclosed in my copending application Serial No. 595,573, filed May 24, 1945, for Coil Assembly for Geophysical Prospecting, and now Patent No. 2,807,777.

The transmitter coil 10 is connected in parallel between a pair of inductances 12 and 13 which may form the secondary windings of suitable transformers. The secondary 12 is inductively coupled through the primary 14 of the transformer to an oscillator 15 which may be adjusted, for example, to produce a signal or current having a frequency of 100 kilocycles although the oscillator may be adjusted to any other desired frequency. For the best results in nonmetallic mine detection, the frequency should not be much less than 20 kilocycles.

A tuning condenser 16 is connected between one end of the coil 10 and the secondary 12 in order to tune this leg of the circuit to a frequency of the oscillator 15. Also, a condenser 17 is connected across the secondary 12, the value of this condenser and its relationship to the inductance 12 being such as to render this leg of the circuit anti-resonant to the frequency of the oscillator 18 which is coupled inductively through the primary winding 19 to the secondary 13. The action of the inductance 12 and condenser 17 is to block or filter out the current from the oscillator 18 in the portion of the circuit connecting the oscillator 15 to the coil 10.

Similarly, the conductor 20 connecting one end of the coil 10 to the inductance 13 is connected through an inductance 21 and a condenser 22, in parallel, which forms a blocking or filtering circuit that is anti-resonant to a current of the frequency produced by the oscillator 15. A tuning condenser 23 is also connected in this leg of the circuit to tune the leg to the frequency of the oscillator 18. The oscillator 18 is adjusted to a frequency different from the frequency of the oscillator 15 and in a typical form of mine detecting apparatus may be tuned to produce a 200 kilocycle current.

With both of the oscillators in operation, currents of the two frequencies will flow in the transmitting coil 10 and will set up fields and, therefore, eddy currents in the medium adjacent which the coil 10 is moved or positioned. So long as the fields produced are symmetrical with respect to the receiving coil 11, the receiving coil 11 will not pick up any signal. When, however, a foreign object in the medium, for example, a metallic mine is encountered in the earth, currents will be induced in the metallic mine which in turn induce currents or signals at 100 kilocycles and 200 kilocycles frequency in the receiving coil 11. If a nonmetallic object such as a nonmetallic mine in the earth is encountered in an unsymmetrical position with respect to the coils, the symmetry of the eddy currents is disturbed by the presence of the nonmetallic mine and signals at 100 kilocycles and 200 kilocycles frequency are induced in the coil 11.

For the following example of the operation of the network, it will be assumed that the two currents flowing in the transmitting coil 10 are of the same amplitude or intensity. Under these conditions, and because of the high value of the two frequencies, the amplitudes of the two signals due to the metallic object and corresponding respectively to each of the two frequencies, are in the ratio of these frequencies. Therefore, the 200 kilocycle signal will have about twice the amplitude of the 100 kilocycle signal in the case of a metallic object.

Where the coils are brought near a nonmetallic mine in the earth, the signals in the receiving coils are produced by dissymmetries in the eddy currents and, therefore, in the secondary magnetic fields they produce, at each of the two frequencies. The two signals corresponding respectively to each of the two frequencies are in the ratio of the squares of the two frequencies. Therefore, the amplitude of the 200 kilocycle signal will, in the case of nonmetallic mines, be about four times as great as the amplitude of the 100 kilocycle signal.

The difference in the relation of signals to frequency for the two cases of metal objects and nonmetallic mines in conductive ground is due to the fact that, for the frequencies used, the metal object is almost equivalent to a pure inductance, whereas the conductive ground surrounding the nonmetallic mine is almost equivalent to a pure resistance.

The difference in the ratios of the amplitudes of the signals corresponding respectively to the two frequencies, depending upon whether a metallic or a nonmetallic object is detected, makes it possible to distinguish between these two categories of objects.

In order to take advantage of and obtain interpretable indications of the presence of such nonmetallic and metallic mines, the receiving coil 11 is connected in parallel with filtering circuits 24 and 25 which are similar to the anti-resonant circuits described above. The ends of the coil 11 are connected by means of the conductors 26 and 26a to the ends of the primaries 27 and 28 of coupling transformers. The secondaries 29 and 30 of the coupling transformers are connected to the amplifiers 31 and 32 which are tuned respectively to the frequencies of the oscillators 15 and 18. The conductor 26 is provided with tuning condensers 33 and 34 between the coil 11 and the primaries 27 and 28, respectively, for tuning the two legs of the circuit to the frequencies of the amplifier connected therewith. The circuit 24 is provided with a capacitance 35 connected across the primary 27 to render this leg of the circuit anti-resonant to signals having the frequency of the oscillator 18. One end of the coil 11 is connected to one end of the primary 28 through a capacitance 36 and an inductance 37 in parallel to render the circuit 25 anti-resonant to signals having the frequency of the oscillator 15.

The circuit 24, therefore, filters out or blocks the passage of signals of 200 kilocycle frequency and passes the 100 kilocycle frequency signal from the coil 11 to the amplifier 31. Similarly, the circuit 25 blocks the passage of signals of 100 kilocycle frequency and permits the passage of the 200 kilocycle signal from the coil 11 to the amplifier 32.

As illustrated, the amplifier 31 may be connected to a suitable indicator 38, such as a voltmeter. The amplifier 32 is similarly connected to an indicator 39, whereby these indicators can give visual indication of the presence of a metallic mine or a nonmetallic mine, as described above. Thus, for example, if the ratio of the amplitude of 200 kilocycle signal to amplitude of the 100 kilocycle signal is about 2 to 1, the presence of a metallic object is indicated. If, on the other hand, the ratio of the amplitude of 200 kilocycle signal to the amplitude of the 100 kilocycle signal is about 4 to 1, the presence of a nonmetallic object is indicated.

If desired, the amplified signals can be rectified and applied in opposition to a single indicator and so matched that a signal from the amplifier 31 will cause deflection of the indicator pointer in one direction and a signal from the amplifier 32 causes deflection of the indicator pointer in the other direction. For example, the two amplifiers 31 and 32 can be constructed to have different gains having a constant relationship to each other so that the reference or zero point on the indicator corresponds to a 3 to 1 ratio between the 200 kilocycle and 100 kilocycle signals, for example. Therefore, when a metallic mine is detected, and the ratio is 2 to 1, the indicator will be deflected to one side of the reference point. When a nonmetallic mine is detected, and the ratio of the 200 kilocycle signal to the 100 kilocycle signal is 4 to 1, the indicator will be deflected to the other side of the reference point. With this arrangement, by observing the deflection of the pointer, it is possible to detect the presence of a foreign object and to determine whether the object is metallic or nonmetallic.

While in the operation described above, the amplitudes of the currents introduced by the oscillators were assumed to be equal, it will be understood that currents of unequal amplitudes may be used and compensation may be made by using amplifiers having suitable gains.

Devices of the type described above can be rendered even more efficient by rendering them phase selective or discriminating in the manner disclosed, for example, in my copending application Serial No. 656,574, filed March 23, 1946, Methods and Systems for Maintaining Alternating Current Networks in a Reference Condition, now Patent No. 2,753,520.

In such case, principal reliance might be had upon the use of a permanent signal of resistive phase to cause the system to discriminate strongly against signals of the inductive phase whereby, in the case of metallic objects, only the resistive component of their signal will be detected. Under these conditions, and for the relatively high frequencies mentioned above, the intensities of the two signals, as detected respectively from the two freqeuncies from a metallic object, are substantially equal.

Conversely, the signals due to a nonmetallic mine buried in the ground, being of resistive phase, have not been affected by the phase selection and, therefore, remain in the ratio equal to the ratio of the square of the two frequencies. It is seen, therefore, that when phase selection is used the contrast between metallic objects and nonmetallic objects is substantially increased.

A bridge of the type described above is not restricted to use in the detection of mines, but instead, it is useful for other purposes, such as, for example, the inspection of objects, for example, metal castings or metal products for flaws therein and the inspection of lumber or other materials to determine whether there are foreign objects such as nails or rocks therein. Moreover, the invention may be applied to any alternating current bridge in which a component to be analyzed can be inserted, or in the magnetic field of which, an object to be analyzed can be placed whereby the ratio of the indication obtained at one frequency to the indication obtained at a second frequency is a useful characteristic to be determined. Moreover, the system is susceptible to considerable modification; for example, it may include variable resistances, inductances and capacitances for obtaining an initial balance in the bridge which initial balance might or might not include a permanent signal of predetermined phase for phase selectivity. Different frequencies than those referred to above may be used. Moreover, the circuit may be stabilized as to phase and as to level of the permanent signal as described in my application Serial No. 656,574, filed March 23, 1946.

Therefore, the form of the invention described above should be considered as illustrative only and not as limiting the scope of the following claims.

I claim:

1. A multiple frequency alternating current network comprising a first coil, a second coil adjacent thereto, said coils having substantially nil mutual impedance, a pair of oscillators for supplying currents at two different frequencies simultaneously to said first coil, a pair of amplifiers each tuned to a different one of said two frequencies connected to said second coil, thereby rendering each amplifier insensitive to the frequency to which it is not tuned, and at least one indicator connected to the outputs of said amplifiers, the two frequencies supplied by said oscillators lying in a range for which a conducting object in a nonconducting medium near said coils produces signals in said second coil that are functions of the first power of said frequencies, respectively, whereas a nonconducting object in a conducting medium near said coils produces signals that are functions of the second power of said frequencies, respectively.

2. A multiple frequency alternating current network comprising a first coil, a second coil adjacent thereto, said coils having substantially nil mutual impedance, a pair of oscillators for energizing said first coil simultaneously with currents at two different frequencies, a pair of amplifiers connected to said second coil, means for blocking the flow of current having one of said frequencies through one of said amplifiers, means for blocking the flow of current having the other of said two frequencies through the other amplifier, and at least one indicating means connected to the outputs of said amplifiers, the two frequencies supplied by said oscillators lying in a range for which a conducting object in a nonconducting medium near said coils produces signals in said second coil that are functions of the first power of said frequencies, respectively, whereas a nonconducting object in a conducting medium near said coils produces signals that are functions of the second power of said frequencies, respectively.

3. A multiple frequency alternating current network comprising a transmitting coil, a receiving coil adjacent thereto, a first oscillator for supplying a current at one frequency to said transmitting coil, a second oscillator for supplying a current at a different frequency simultaneously to said transmitting coil, filter means anti-resonant to the frequency of the current of said second oscillator connected between said transmitter coil and said first oscillator, filter means anti-resonant to the frequency of the current of said first oscillator, connected between said second oscillator and said transmitter coil, a pair of amplifiers connected to said receiving coils, means for rendering each of said amplifiers sensitive to only a different one of the two frequencies, and at least one indicator connected to said amplifiers, the two frequencies supplied by said oscillators lying in a range for which a conducting object in a nonconducting medium near said coils produces signals in said second coil that are functions of the first power of said frequencies, respectively, whereas a nonconducting object in a conducting medium near said coils produces signals that are functions of the second power of said frequencies, respectively.

4. In a multiple frequency alternating current network, the combination of a transmitting coil, a first oscillator connected to said coil for energizing said coil with a current of one frequency, a filter means interposed between said coil and said first oscillator for blocking a current of a higher frequency than the oscillator frequency, a second oscillator connected to said coil for supplying a current at said higher frequency simultaneously to said coil, filter means between said coil and said second oscillator for blocking a current having the frequency of the first oscillator current, a receiving coil adjacent to said transmitting coil, a pair of amplifiers connected to said receiving coil, and filter means connected between said receiving coil and said amplifiers for separating the currents having the two frequencies and supplying them respectively to the different amplifiers, the two frequencies supplied by said oscillators lying in a range for which a conducting object in a nonconducting medium near said coils produces signals in said second coil that are functions of the first power of said frequencies, respectively, whereas a nonconducting object in a conducting medium near said coils produces signals that are functions of the second power of said frequencies, respectively.

5. A method of distinguishing between metallic and nonmetallic objects in a conductive medium comprising the steps of simultaneously energizing a first coil with currents at different frequencies, moving said coil relatively to said medium, moving a second coil with said first coil, said coils having substantially nil mutual impedance, separately amplifying currents induced in said second coil having said different frequencies, and obtaining indications of the respective amplitudes of said currents, the two frequencies supplied to said first coil lying in a range for which a conducting object in a nonconducting medium near said coils produces signals in said second coil that are functions of the first power of said frequencies, respectively, whereas a nonconducting object in a conducting medium produces signals that are functions of the second power of said frequencies, respectively.

6. A method of distingushing between metallic and nonmetallic objects in a conductive medium comprising the steps of simultaneously energizing a first coil with currents at different frequencies, moving said coil relatively to said medium, moving a second coil with said first coil, separately amplifying currents induced in said second coil having said two different frequencies and obtaining indications of the ratio of the respective amplitudes of said induced currents; the two frequencies supplied to said first coil lying in a range for which a conducting object in a nonconducting medium near said coils produces signals in said second coil that are functions of the first power of said frequencies, respectively, whereas a nonconducting object in a conducting medium produces signals that are functions of the second power of said frequencies, respectively.

7. A method of distinguishing between metallic and nonmetallic objects in a conductive medium comprising the steps of simultaneously energizing a first coil with currents at two different frequencies, moving said coil relatively to said medium, moving a second coil with said first coil, separately amplifying the two currents induced in said second coil having respectively said two different frequencies and obtaining indications of the ratio of the respective amplitudes of said two currents to determine whether the said ratio is lower or higher than a predetermined reference ratio, the two frequencies supplied to said first coil lying in a range for which a conducting object in a nonconducting medium near said coils produces signals in said second coil that are functions of the first power of said frequencies, respectively, whereas a nonconducting object in a conducting medium near said coils produces signals that are functions of the second power of said frequencies, respectively.

8. A method of classifying materials by comparing their electrical characteristics at two different frequencies, comprising placing a material in the magnetic field of a mutual impedance bridge energized simultaneously at two different frequencies, obtaining indications of the respective amplitudes of the two signals respectively at each of the two frequencies produced in the output of the bridge by the presence of the material, and comparing the respective amplitudes of the said two signals, said two different frequencies lying in a range for which a conducting material in a nonconducting medium in the magnetic field of said bridge produces signals in the output of the bridge that are functions of the first power of said frequencies, respectively, whereas a nonconducting material in a conducting medium in the magnetic field of said bridge produces signals in the output of the bridge that are functions of the second power of said frequencies.

9. A method of classifying electrical circuit components by comparing their electrical characteristics at two different frequencies, which comprises introducing an electrical circuit component into an alternating current bridge energized simultaneously at two different frequencies, obtaining indications of the respective amplitudes of the two signals at each of the two frequencies produced in the output of the bridge by the presence of said component, and comparing the respective amplitudes of the said two signals, said two different frequencies resulting in the production of signals in the output of the bridge that are functions of the first power of the frequency for an inductive electrical circuit component, and that are functions of the second power of the frequency for a resistive electrical circuit component.

References Cited in the file of this patent
UNITED STATES PATENTS

| | | |
|---|---|---|
| 2,139,460 | Potapenko | Dec. 6, 1938 |
| 2,167,630 | Bazzoni et al. | Aug. 1, 1939 |
| 2,220,070 | Aiken | Nov. 5, 1940 |
| 2,268,106 | Blau | Dec. 30, 1941 |
| 2,408,029 | Bazzoni et al. | Sept. 29, 1946 |
| 2,411,843 | Aiken | Dec. 3, 1946 |
| 2,447,316 | Curtis | Aug. 17, 1948 |